R. E. ROSEWARNE.
REVERSING GEARING.
APPLICATION FILED FEB. 1, 1910.

981,005.

Patented Jan. 10, 1911.
4 SHEETS—SHEET 1.

Witnesses
Inventor
Richard E. Rosewarne,
By Knight Bros.
Attorneys

R. E. ROSEWARNE.
REVERSING GEARING.
APPLICATION FILED FEB. 1, 1910.

981,005.

Patented Jan. 10, 1911.
4 SHEETS—SHEET 2.

Witnesses
C. K. Reichenbach.
J. M. Wynkoop.

Inventor,
Richard E. Rosewarne
Knight Bros
Attorneys

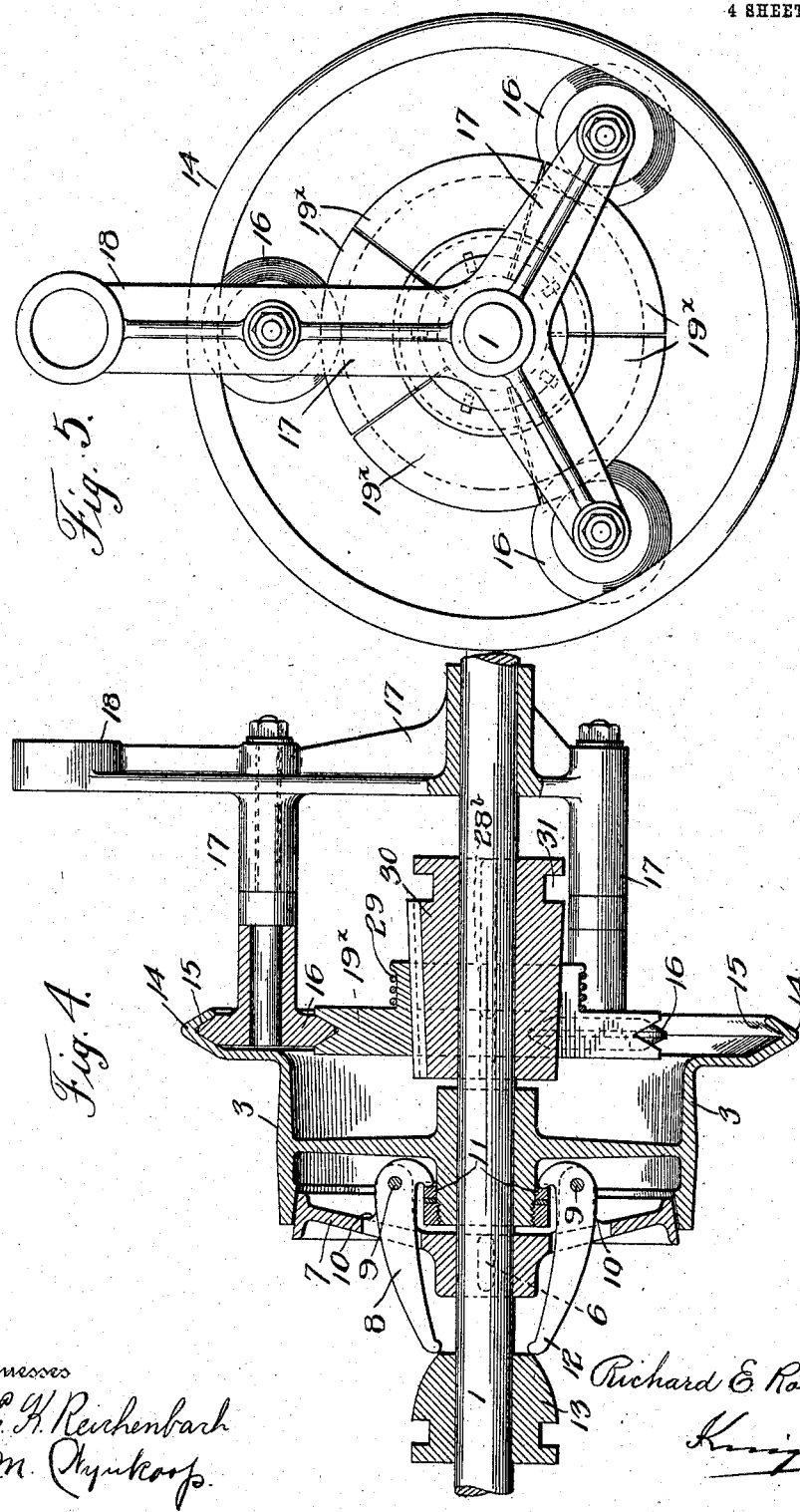

R. E. ROSEWARNE.
REVERSING GEARING.
APPLICATION FILED FEB. 1, 1910.
981,005.
Patented Jan. 10, 1911.
4 SHEETS—SHEET 4.
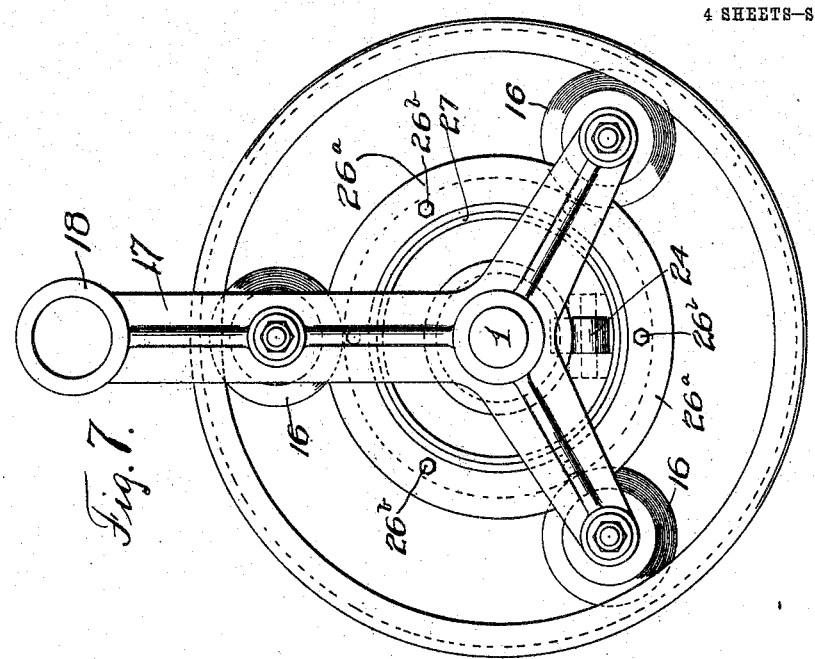
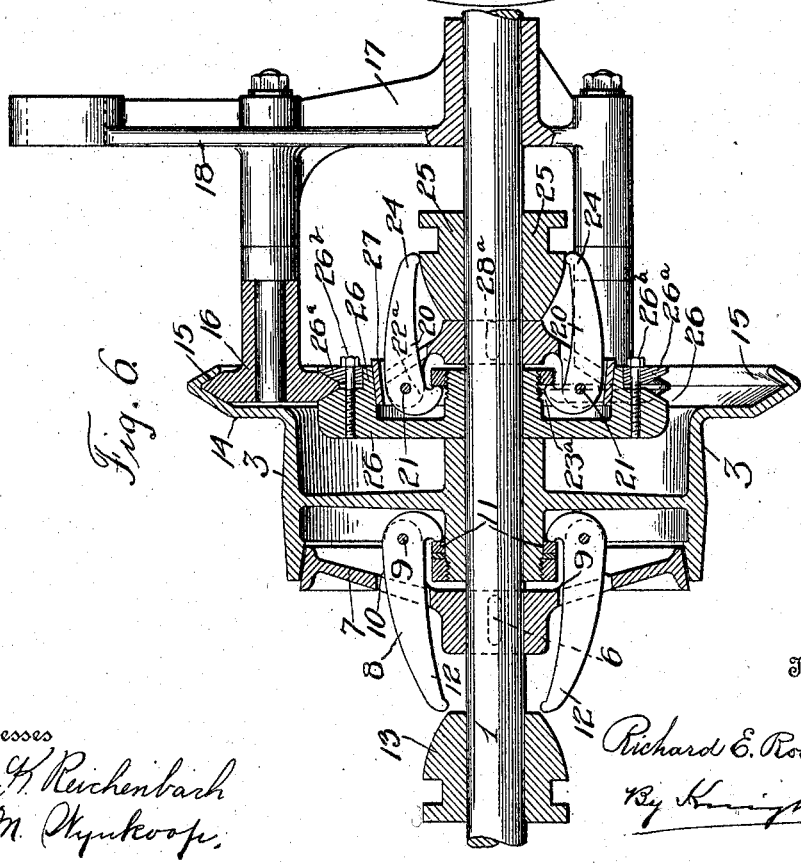
Witnesses
E. K. Reichenbach
J. M. Stynkoop.
Inventor
Richard E. Rosewarne,
By Knight Bros
Attorneys

UNITED STATES PATENT OFFICE.

RICHARD E. ROSEWARNE, OF COVINGTON, KENTUCKY, ASSIGNOR TO THE MILLER, DU BRUL & PETERS MANUFACTURING COMPANY, OF CINCINNATI, OHIO, A CORPORATION OF OHIO.

REVERSING-GEARING.

981,005.   Specification of Letters Patent.   Patented Jan. 10, 1911.

Application filed February 1, 1910. Serial No. 541,393.

*To all whom it may concern:*

Be it known that I, RICHARD E. ROSEWARNE, a citizen of the United States, and resident of Covington, in the county of Kenton and State of Kentucky, have invented certain new and useful Improvements in Reversing-Gearing, of which the following is a specification.

This invention relates to means for driving either directly or in a reverse direction from one pulley shaft to another pulley shaft, and has for its object to eliminate one of the two belts usually employed and to simplify and render more efficient and durable in service, the means employed for this purpose. To these ends, I employ a pulley constructed for loose mounting upon a shaft, a tapered friction disk adapted to be keyed to the same shaft, but movable in the direction of its axis to bring its tapered periphery into frictional impingement with the pulley, for the purpose of frictionally establishing one drive; also one or more idlers adapted to impinge an internal V-shaped groove formed in a radial flange on the pulley, and a member keyed to the shaft radially within the idlers, and adapted to be driven immediately by frictional contact with the idlers, or through the medium of an interposed member with which the keyed member may be brought into frictional contact, for the purpose of frictionally establishing the other drive; the frictional connections which produce forward or reverse driving being established in each case by levers fulcrumed on one of the relatively movable parts and engaging the other of said parts and having spreading ends which receive spreading cones longitudinally slidable upon the shaft, under the control of a common shifting means which moves them reciprocally into and out of effective position.

Figure 1:
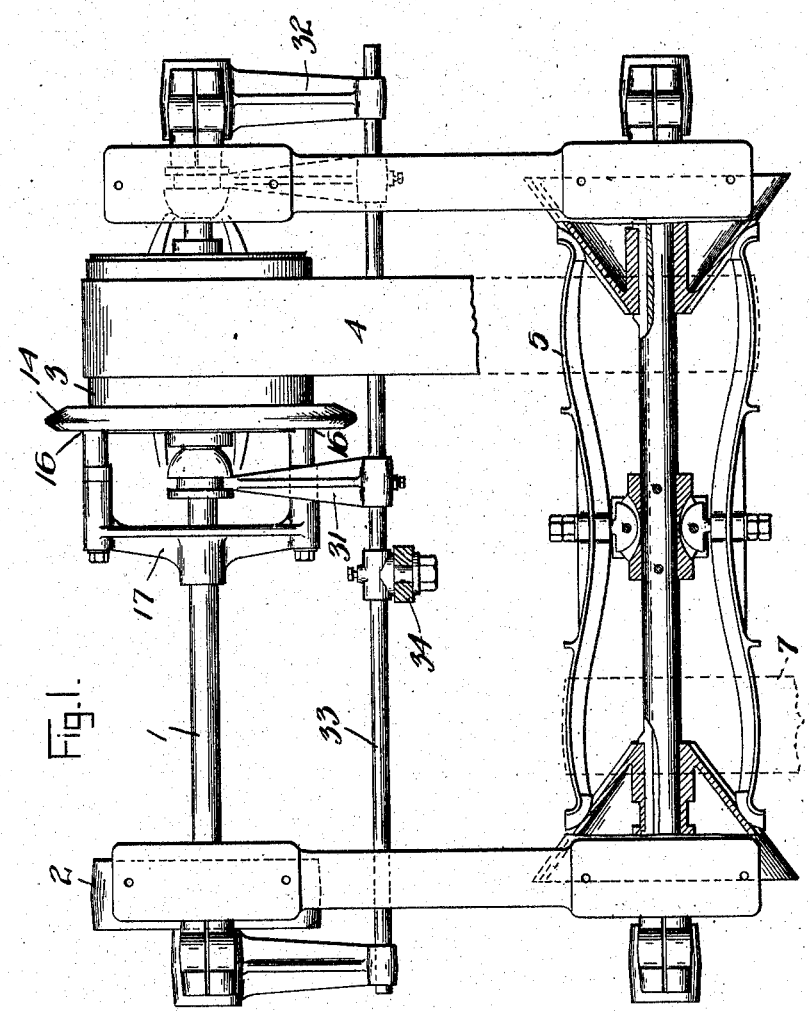
Figure 3:
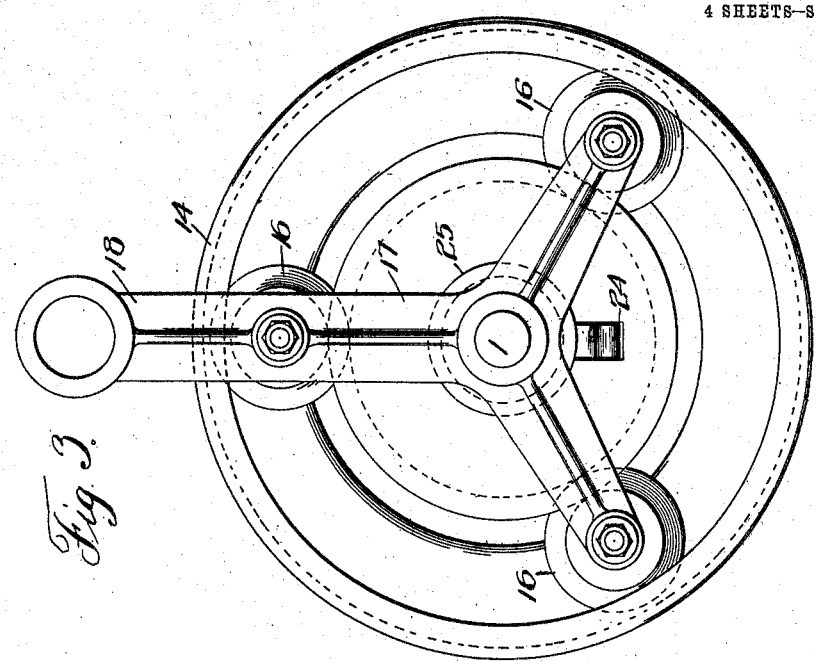
Figure 2:
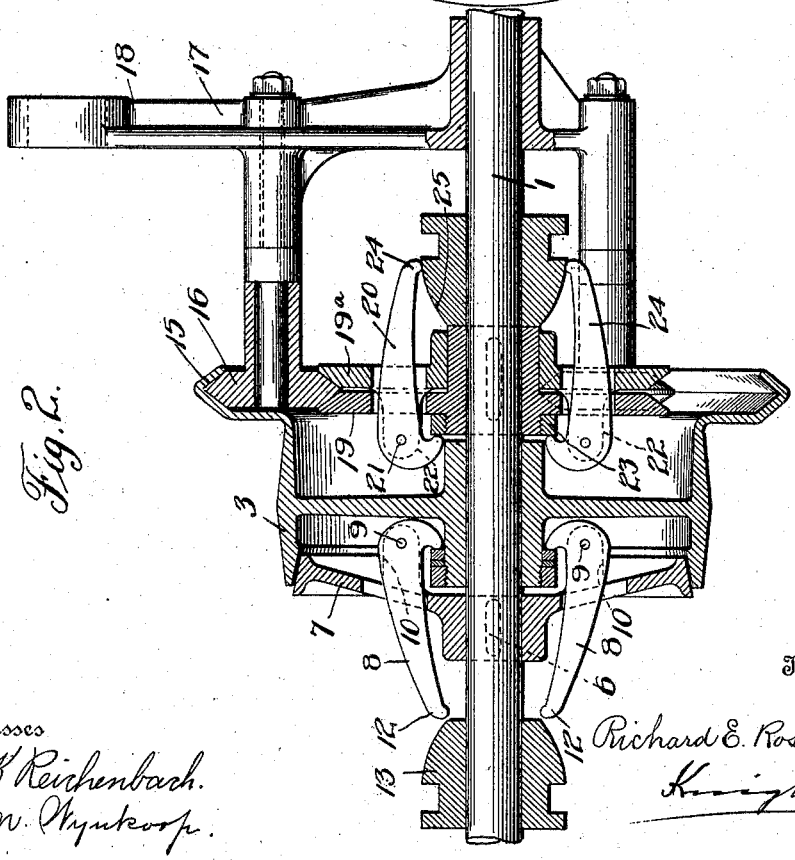

The invention will be fully understood upon reference to the accompanying drawings, in which, Figure 1 is a top plan view of my improved reverse gearing, its controlling rigging, and a speed-changing gearing; the latter forming no part of the present invention but being added for the purpose of illustrating one mode of putting my present invention into use; Figs. 2 and 3 are, respectively, an axial section and an end view of one construction of the reverse gearing; Figs. 4 and 5 are similar views of another construction; and Figs. 6 and 7 are similar views of still another construction.

In each of the embodiments shown, a shaft 1, that may be driven in any suitable manner as by a pulley 2 (Fig. 1), carries a specially constructed loose pulley 3 that is to be utilized to transmit power to or from a belt such as 4, running upon a pulley such, for instance, as 5. Keyed to shaft 1, at 6, with limited axial movement, is a tapered friction disk 7, adapted to be forced into frictional driving impingement with pulley 3, by levers 8 fulcrumed at 9 to ears 10 on the disk, and having their short ends engaging the pulley-hub at 11, while their longer ends 12 project through slots in the disk and receive the spreading cone 13. As the cone 13 is forced between the ends 12, the levers draw the disk and pulley together, and direct driving connection is established between pulley 3 and shaft 1.

To establish reverse driving connection between pulley 3 and shaft 1, said pulley is constructed with a radial flange 14 having an internal V-shaped friction face 15, while an annular series of correspondingly formed reversing idlers 16, mounted with freedom of revolution in a spider 17 that is held against rotation by arm 18, are in frictional impingement with groove 15.

For the purpose of making and interrupting transmission from idlers 16 to the shaft 1, three different constructions are disclosed.

According to Figs. 2 and 3, a disk divided in the plane of the idlers, with one part 19 keyed at 28 through its hub, to the shaft, and its other part 19ª axially slidable upon said hub, is adapted to be pressed upon the idlers, by means of levers 20 fulcrumed at 21 upon ears 22 (see dotted lines) carried by the member 19ª having their short arms engaging the member 19 at 23, and their long arms 24 projecting through slots in said member 19ª in position to receive a spreading cone 25. When spreading cone 25 moves between levers 20, the members 19 and 19ª are pressed upon the friction faces of the idlers which may thereby be forced into even more intimate driving impingement with groove 15, and revolution of pulley 3 and shaft 1 is enforced in opposite directions.

According to the embodiment shown in Figs. 4 and 5, the transmission member between the idlers and the shaft is represented at 19ˣ as a segmental disk having a peripheral groove to receive the idlers 16 and normally pressed together by a spring 29, but brought into frictional-driving relation to the idlers by radial expansion induced by the taper cone 30 which is keyed at 28ª to the shaft and has splined connection with each of said segments. When the cone 30 is forced inward, segmental disk 19ˣ expands against idler 16, forcing the latter more tightly against the walls of groove 15, and reversal in the drive between pulley 3 and shaft 1 takes place.

According to the embodiment shown in Figs. 6 and 7, a disk 26 which, with its co-operating jaw 26ª, is pressed by screws 26ᵇ (adjustable to take up wear) into constant driving frictional contact with idlers 16, and, therefore, runs in reverse direction to pulley 3, is loosely mounted upon shaft 1, but is thrown into and out of driving connection therewith by disk 27 keyed to shaft 1 at 28ª and carrying levers 20 heretofore described, which engage disk 26 at 23ª, and engage the spreading cone 25, through the arms 24. When cone 25 is forced between the arms 24, disk 27 impinges disk 26 and reverse drive is enforced.

For reciprocally moving the cones 13 and 25, of Figs. 2 and 6, or the cones 13 and 30 of Fig. 4, any convenient means may be employed, such for instance as the arms 31, 32 of Fig. 1 mounted upon thrust shaft 33 which is under control of lever 34.

It is not essential that the idlers remain in frictional drive relation with the pulley. They may be carried upon eccentric studs or have enlarged bores as shown, or otherwise movably mounted to enable them to move out of contact with the internal groove when pressure is relieved by the divided disk.

It is desirable that the shoulders provided for abutment of the short arms of the levers 20, etc., be adjustable, as by threading them upon the hubs of the members which they control, so as to regulate the pressure developed through the levers.

Having thus described my invention, what I claim as new therein and desire to secure by Letters Patent is:—

1. In a reverse gearing, a shaft, a pulley loosely mounted upon said shaft, a releasable direct drive connection between the pulley and shaft, and means for establishing a reverse driving connection between the pulley and shaft comprising a series of idlers in driving relation to the pulley, and a disk receiving the idlers, divided into members movable relatively to the idlers to regulate driving connection between the disk and idlers and increase friction between the idlers and the pulley.

2. In a reverse gearing, a shaft, a pulley loosely mounted upon said shaft, a releasable direct drive connection between the pulley and shaft, and means for establishing a reverse driving connection between the pulley and shaft comprising a series of idlers in driving relation to the pulley, and the disk receiving the idlers, divided in the plane of the idlers, into members, and having its said members movable relatively to the idlers to regulate driving connection between the disk and idlers and increase friction between the idlers and the pulley.

3. In a reverse gearing, a shaft, a pulley loosely mounted upon the shaft, a releasable direct drive connection between the pulley and shaft, and means for establishing a reverse driving connection between the pulley and shaft comprising a series of idlers, in driving relation to the pulley, the disk receiving the idlers, divided into members movable relatively to the idlers to regulate driving connection between the disk and idlers and increase friction between the idlers and the pulley, and means for imparting such relative movement to the disk members, to establish and interrupt such reverse driving connection with the shaft.

4. In a reverse gearing, a shaft, a pulley loosely mounted upon said shaft, a releasable direct drive connection between the pulley and shaft, and means for establishing a reverse driving connection between the pulley and shaft comprising a series of idlers, the disk receiving the idlers divided into members movable relatively to the idlers to regulate driving connection between the disk and idlers and increase friction between the idlers and the pulley, and means for establishing and interrupting such reverse driving connection with the shaft, consisting of pressure-developing means adapted to press the members of the divided disk upon the idlers, and increase the friction between the idlers and the pulley.

5. In a reverse gearing, a shaft, a pulley loosely mounted upon a shaft, a releasable direct drive connection between the pulley and shaft, and means for establishing a reverse driving connection between the pulley and shaft comprising a series of idlers, the disk receiving the idlers divided into members movable relatively to the idlers to regulate driving connection between the disk and idlers and increase friction between the idlers and the pulley, and means for establishing and interrupting such reverse driving connection with the shaft, consisting of pressure levers, and a spreading cone for said levers.

6. In a reverse gearing, a shaft, a pulley loosely mounted upon said shaft, a releasable direct drive connection between the pulley and shaft, and means for establishing a reverse driving connection between the pulley and shaft comprising a series of idlers, and the disk receiving the idlers divided in the plane of the idlers, into members movable relatively to the idlers to regulate driving connection between the disk and idlers and increase friction between the idlers and the pulley, and means for pressing the members of the divided disk upon the idlers, consisting of pressure levers fulcrumed upon one of the members of the disk and engaging the other of said members in the direction to force the members together, and a spreading cone for said levers.

7. In a reverse gearing, a shaft, a pulley constructed with a friction face and an internal V-shaped groove and loosely mounted upon said shaft, a releasable direct drive disk having non-rotating connection with the shaft and movable into and out of frictional engagement with the pulley, a series of idlers having tapered peripheries frictionally engaging the V-shaped groove of the pulley, a disk constructed with an external V-shaped groove receiving the peripheries of the idlers, and means pressing the walls of the said disk groove against the frictional faces of the idlers, in a direction to press the idlers into the groove of the pulley.

8. In a reverse gearing, a shaft, a pulley loosely mounted upon said shaft, a releasable direct drive connection between the pulley and shaft, and means for establishing a reverse driving connection between the pulley and shaft comprising a spider concentrically mounted on the shaft, a series of idlers mounted on said spider, and the disk receiving the idlers, divided into members movable relatively to the idlers to regulate driving connection between the disk and idlers and increase friction between the idlers and the pulley.

9. In a reverse gearing, a shaft, a pulley loosely mounted upon said shaft, a releasable direct drive connection between the pulley and shaft, and means for establishing a reverse driving connection between the pulley and shaft comprising a spider concentrically mounted on the shaft and having means preventing its rotation with the shaft, a series of idlers mounted on said spider, and the disk receiving the idlers divided into members movable relatively to the idlers to regulate driving connection between the disk and idlers and increase friction between the idlers and the pulley.

The foregoing specification signed at Cincinnati Ohio this 11th day of January, 1910.

RICHARD E. ROSEWARNE.

In presence of—
  D. S. Du Brul,
  E. F. Du Brul.